US011590922B2

(12) United States Patent
Schneider

(10) Patent No.: US 11,590,922 B2
(45) Date of Patent: Feb. 28, 2023

(54) OCCUPANT RESTRAINT SYSTEM FOR A VEHICLE SEAT INCLUDING EXTERNAL TETHERING

(71) Applicant: AUTOLIV ASP, INC., Ogden, UT (US)

(72) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/094,937

(22) Filed: Nov. 11, 2020

(65) Prior Publication Data
US 2022/0144204 A1 May 12, 2022

(51) Int. Cl.
*B60R 21/207* (2006.01)
*B60R 21/2338* (2011.01)
*B60R 21/231* (2011.01)
*B60N 2/806* (2018.01)
*B60R 21/26* (2011.01)
*B60R 22/18* (2006.01)

(52) U.S. Cl.
CPC .......... *B60R 21/2338* (2013.01); *B60N 2/806* (2018.02); *B60R 21/207* (2013.01); *B60R 21/231* (2013.01); *B60R 21/23138* (2013.01); *B60R 21/26* (2013.01); *B60R 2021/23107* (2013.01); *B60R 2021/23146* (2013.01); *B60R 2021/23386* (2013.01); *B60R 2021/23388* (2013.01); *B60R 2022/1818* (2013.01)

(58) Field of Classification Search
CPC . B60R 21/207; B60R 21/2338; B60R 21/231; B60R 21/23138; B60R 2021/23386; B60R 2021/23107; B60R 2021/23146; B60R 2022/1818; B60R 21/237; B60N 2/806
USPC ........................................................ 280/730.2
See application file for complete search history.

(56) References Cited

U.S. PATENT DOCUMENTS

| | | | |
|---|---|---|---|
| 5,439,272 A * | 8/1995 | Hallet ................. | B60N 2/2352 297/473 |
| 10,189,432 B2 | 1/2019 | Matsushita et al. | |
| 2018/0326938 A1 * | 11/2018 | Rickenbach .......... | B60R 21/233 |
| 2019/0054884 A1 * | 2/2019 | Dry ..................... | B60R 21/2338 |
| 2019/0071046 A1 * | 3/2019 | Dry ..................... | B60R 21/207 |
| 2019/0248323 A1 | 8/2019 | Saito et al. | |
| 2019/0275979 A1 * | 9/2019 | Dry ..................... | B60R 21/2338 |
| 2019/0389420 A1 * | 12/2019 | Dry ..................... | B60R 21/207 |
| 2020/0290551 A1 * | 9/2020 | Shimizu ............... | B60R 21/207 |

FOREIGN PATENT DOCUMENTS

| WO | 2019107053 A1 | 6/2019 |
|---|---|---|
| WO | 2019107073 A1 | 6/2019 |
| WO | 2020017281 A1 | 1/2020 |

* cited by examiner

*Primary Examiner* — Keith J Frisby
(74) *Attorney, Agent, or Firm* — Harness, Dickey & Pierce, P.L.C.; Stephen T. Olson

(57) ABSTRACT

An occupant restraint system for a seat of a vehicle includes at least a first airbag carried by the seat and deployable from the seat and at least a first tether mounted to the seat and deployable from a stowed position to a deployed position such that the first tether extends around a front facing side of the first airbag from a first lateral side of a seatback of the seat to a second lateral side of the seatback.

19 Claims, 3 Drawing Sheets

OCCUPANT RESTRAINT SYSTEM FOR A VEHICLE SEAT INCLUDING EXTERNAL TETHERING

FIELD

The present disclosure generally concerns seat integrated occupant restraint systems. More particularly, the present disclosure relates to an occupant restraint system for a vehicle seat including external tethering extending around a front facing side of at least one airbag deployable from the seat.

BACKGROUND

This section provides background information related to the present disclosure which is not necessarily prior art.

Inflatable occupant restraints or airbags are commonly included on motor vehicles. In the event of an accident or impending accident, a sensor within the vehicle measures abnormal deceleration, for example, and triggers inflation of the airbag within a few milliseconds with gas produced by a device commonly referred to as an "inflator". The inflated airbag cushions the vehicle occupant from impact forces.

It is generally known to provide a vehicle seat with airbags arranged to deploy from the vehicle seat on laterally opposing sides of a seat occupant. One such occupant restraint system for a vehicle seat is shown and described in U.S. Pat. No. 10,189,432. This patent generally discloses right and left airbags normally stored in right and left sides of a seatback of the seat, respectively. Tension members are connected to both of the airbags and the vehicle seat. Upon inflation and deployment of the airbags, the tension members operate to maintain a desired positioning of the airbags to thereby more securely restrain the occupant. U.S. Pat. No. 10,189,432 is incorporated by reference as if fully set forth herein.

While known occupant restraint systems for vehicle seats, including the occupant restraint system of U.S. Pat. No. 10,189,432, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a seat-integrated airbag system using an external tethering system, which provides improved occupant kinematics and restraint for both belted and unbelted occupants.

It is a related object of the present teachings to provide a seat-integrated airbag system that alleviates adverse interaction with pillar-mounted seat belts.

In accordance with one particular aspect, the present teachings provide an occupant restraint system for a seat of a vehicle. The occupant restraint system includes at least a first airbag carried by the seat and deployable from the seat and at least a first tether mounted to the seat and deployable from a stowed position to a deployed position. Upon deployment, the first tether extends around a front facing side of the first airbag from a first lateral side of a seatback of the seat to a second lateral side of the seatback.

In accordance with another particular aspect, the present teachings provide a vehicle seat including a seatback, a first airbag and a first tether. The first airbag is carried at a first lateral side of the seatback and deployable from the seatback. The first tether is mounted to the seatback and includes a central portion normally stowed within a tether housing. The tether housing has a U-shape with first and second laterally spaced apart legs upwardly extending from the seatback. The first tether is deployable from the stowed position to a deployed position such that the first tether extends around a front facing side of the first airbag from a first lateral side of a seatback of the seat to a second lateral side of the seatback.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figures 1, 1A:
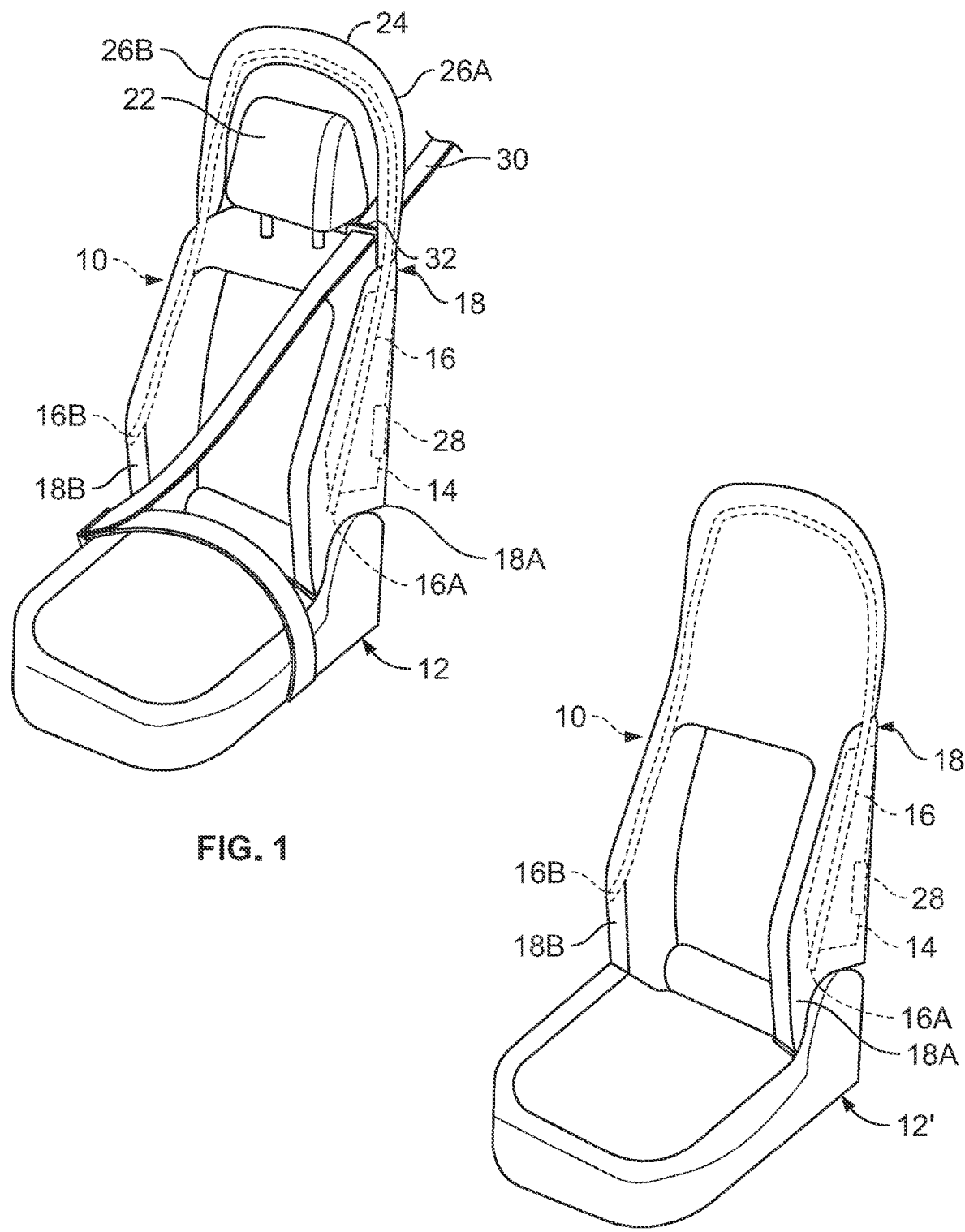
FIG. 1 is a perspective view of an occupant restraint system for a vehicle seat in accordance with the present teachings, the occupant restraint system shown operatively associated with an exemplary vehicle seat and shown prior to deployment.
FIG. 1A is a perspective view similar to FIG. 1 illustrating the occupant restraint system incorporated into an alternative vehicle seat having a tether housing integrated into a fixed headrest of the vehicle seat.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With general reference to the drawings, various embodiments of occupant restraint systems in accordance with the present teachings are illustrated. The occupant restraint systems are shown integrated into a seat 12 for a vehicle. The seat or vehicle seat 12 may have a dedicated location within a vehicle or may be movably located within a vehicle, including but not limited to an autonomous vehicle. It will be understood that the particular vehicle seat 12 shown in the drawings is merely exemplary. In this regard, various aspects of the present teachings may be readily adapted for use with various other vehicle seats.

Figure 2:
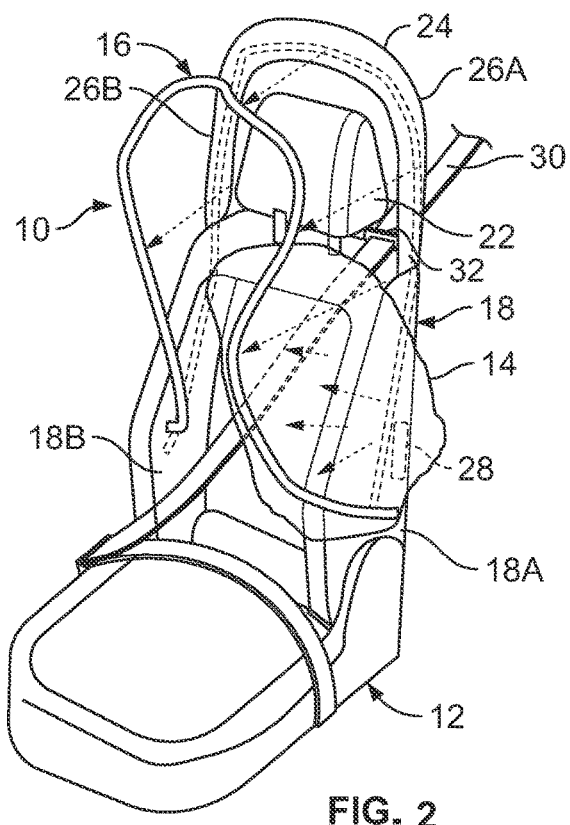
FIG. 2 is a perspective view similar to FIG. 1 illustrating the occupant restraint system of FIG. 1 as the occupant restraint system begins to deploy in response to a predetermined accident event.
Figure 3:
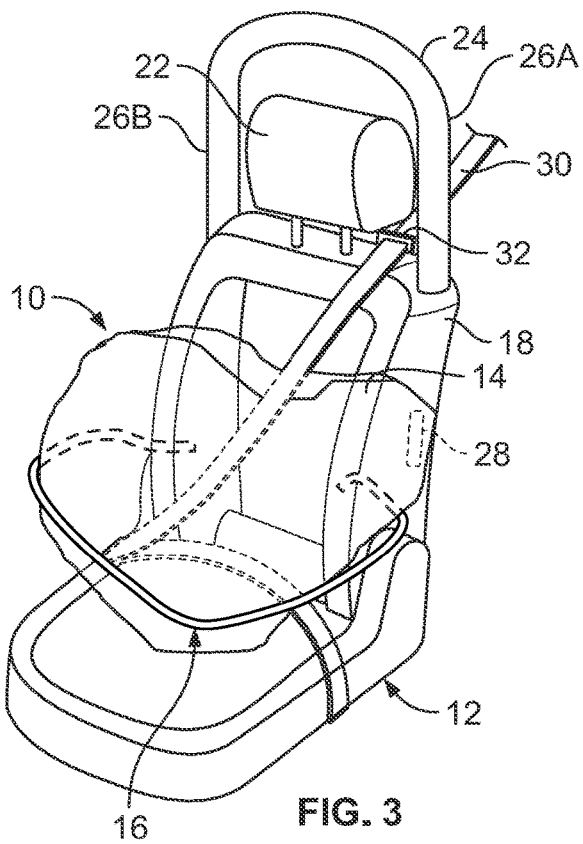
FIG. 3 is another perspective view similar to FIG. 1 illustrating the occupant restraint system of FIG. 1 at full deployment.

With particular reference to FIGS. 1 through 3 of the drawings, a first occupant restraint system in accordance with the present teachings is illustrated and generally identified at reference character 10. The occupant restraint system 10 is generally shown to include at least a first airbag 14 and at least a first tether or first external tether 16. The first airbag 14 is carried by and deployable from a first lateral side 18A of a seatback 18 of the seat 12. In the particular embodiment illustrated, the first airbag 14 is carried by and deployable from the first lateral side or left lateral side 18A of the seatback 18. Except as otherwise described herein, the construction and operation of the airbags, including mounting to and deployment from the seat 12, will be understood to be exemplary insofar as the present teachings are concerned. Explaining further, other airbag mountings and airbag configurations may be adapted for use within the scope of the present teachings.

The first tether 16 is mounted to the seat 12 and deployable from a stowed position (as shown in FIG. 1) to a deployed position (as shown in FIG. 3). In the deployed position, the first tether 16 extends around a front facing side of the first airbag 14 from the first lateral side 18A of seatback 18 of the seat 12 to a second or right lateral side 18B of the seatback 18. As illustrated, a first end 16A of the tether 16 is attached to the first lateral side 18A and a second end 16B of the tether is attached to the second lateral side 18B. The tether 16 may be additionally sewn or otherwise suitably attached to the airbag 14.

In the stowed position, the first tether 16 extends vertically upward from the first end 16A, is routed overhead and horizontally from the first lateral side 18A of the seatback 18 to the second lateral side 18B of the seatback 18, and extends vertically downward to the second end 16B. As shown in FIG. 1, the seat 12 includes a headrest 22 adjustably connected to the seatback 18 and upwardly extending from an upper end of the seatback 18. The first tether 16 is carried within a tether housing defined by a trim component 24. The tether housing or trim component 24 is a generally U-shaped trim component including first and second laterally spaced apart legs 26A and 26B that upwardly extend from the seatback 18. The headrest 22 is laterally positioned between the first and second laterally spaced apart legs 26A and 26B.

A central portion of the tether 16 is normally stowed within the tether housing 24. The tether 16 is not directly attached to the tether housing 24. Therefore, the tether housing 24 simply acts as a "carrier" for the tether 16 and does not function to support the loading from the tether 16 under tension. The tether housing 24 and the seat 12 may be conventionally provided with a split line (not specifically shown) to assist in the exit of the tether 16 from the tether housing 24 and the seat 12.

With reference to FIG. 1A, an alternative arrangement is shown in which the occupant restraint system 10 is incorporated into an alternative vehicle seat 12' having the tether housing 24 integrated into a fixed headrest portion of the vehicle seat 12. It will be understood that any of the occupant restraint systems described herein may similarly be adapted for use with a seat having a fixed headrest.

As shown in FIG. 2, when a predetermined accident event is sensed, an inflator 28 is controlled to inflate the airbag 14. The inflator 28 may be carried by the seatback 18. As the airbag 14 inflates, the tether 16 is "pulled" out of the tether housing 24 and over the top of the head of the occupant (not specifically shown). When the airbag 14 deploys from the side of the seatback 18 and positions in front of the occupant, the tether 16 becomes taut and maintains tension to the seatback 18 as the occupant translates forward and engages the airbag 14.

According to the present teachings, a single airbag 14 may be used for various applications to sufficiently restrain the occupant during both belted and unbelted conditions. In the embodiment illustrated, the airbag 14 may have an L-shape in a horizontal plane. When the airbag 14 is deployed, a first leg of the L-shape extends from the seatback 18 in a forward direction relative to a direction of vehicle travel and a second leg of the L-shape extends laterally from the first lateral side of the seat 12 across a front of the occupant. By utilizing a single airbag, the present teachings allow for lower cost, lower mass, reduced packaging size and other advantages as compared to conventional seat-integrated system.

The tether 16 functions to restrain both inboard and outboard sides of the airbag 14 by the seatback 18. This restraint of the airbag 14 prevents outward rotation of the airbag 14 away from the occupant during loading and thereby significantly improves restraint coverage and occupant containment. In the embodiment illustrated, the L-shaped geometry of the airbag 14 wraps around the occupant to improve impact cushioning coverage in front of the occupant. In certain applications, it may be desirable to further wrap around the occupant by incorporating an airbag having a U-shaped geometry. The airbag may also be configured to further extend upward or downward to provide additional coverage for the head and pelvis, respectively.

The present teachings overcome significant disadvantages associated with belting systems as compared to conventional seat-integrated occupant restraint systems. Explaining further, conventional seat-integrated occupant restraint systems require a belt-in-seat to enable proper belt routing below the tension members. As the airbags inflate, the tension members position over the top of the shoulder belt and the belt routing remains positioned over the shoulder and diagonally across the chest of the user. Pillar-mounted seat belts present significant challenges for conventional seat-integrated occupant restraint systems since the shoulder belt needs to route over the top of the tension members that are packaged in the seatback. As the system deploys, the tension members would become trapped below the shoulder belt and unable to properly position to support the airbag. This may result in over-pressurization of the airbag due to restriction by the seat belt. Tension member and airbag interaction with the seat belt may also force the shoulder belt off of the shoulder of the occupant and result in a loss of restraint.

As shown in FIGS. 1-3, the present teachings overcome this issue with pillar-mounted seat belts by routing a seat belt webbing 30 of a pillar mounted seat belt laterally between the first and second laterally spaced legs 26A and 26B of the tether housing 24. The seat belt webbing 30 may be guided by and pass through a guide member or loop 32. The loop 32 may be carried by the tether housing 24. Alternatively, the loop 32 may be attached to a top of the seatback 18. In either case, the loop 32 is disposed within the U-shape of the tether housing 24 and the seat belt webbing of a pillar-mounted seat belt system can be routed between the first and second laterally spaced apart legs 26A and 26B so as to not interfere with deployment of either the airbag 14 or the tether 16.

In certain applications, it may be desirable to additionally incorporate a tether tensioning mechanism or "slack reducer". The tensioning mechanism may be in the general form of a conventional seat belt lap pretensioner or retractor pretensioner and may function to reduce a length of the tether 16 after deployment and positioning of the airbag 14. In this manner, slack in the tether 16 may be eliminated to provide increased tension to support the airbag 14 for more effective occupant restraint. The tensioner may include a load limiting device to enable controlled pay-out of the tether 16 once a desired tensile load is achieved. Alternatively, tether load limiting may be activated at a specific time, dependent upon various sensor inputs such as crash severity, belt status, occupant size or weight, and other factors.

Figure 4:
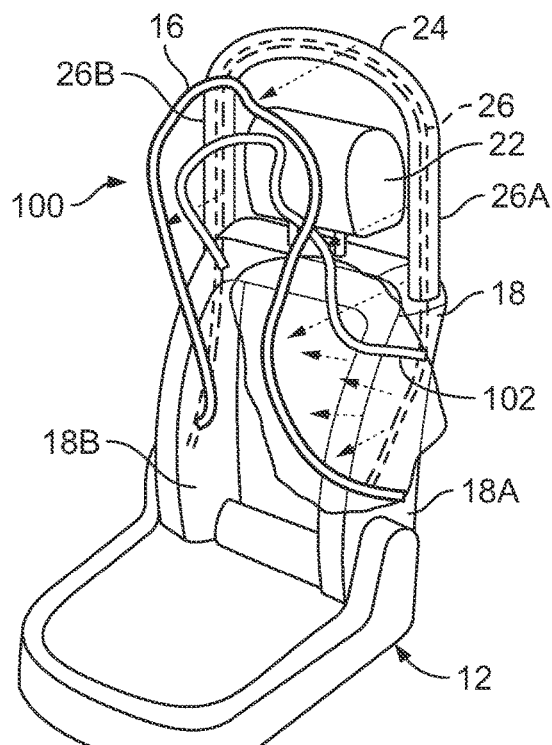
FIG. 4 is another perspective view similar to FIG. 1 illustrating another occupant restraint system in accordance with the present teachings, the occupant restraint system shown as the occupant restraint system begins to deploy in response to a predetermined accident event.
Figure 5:
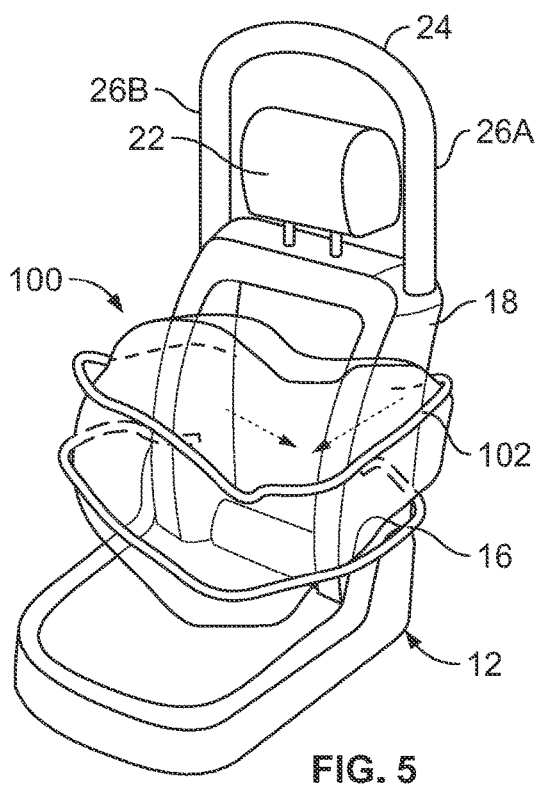
FIG. 5 is a perspective view similar to FIG. 4 illustrating the occupant restraint system of FIG. 4 at full deployment.

Turning to FIGS. 4 and 5, another occupant restraint system in accordance with the present teachings is illustrated and identified at reference character 100. In view of the similarities between the occupant restraint system 10 and the occupant restraint system 100, like reference characters will be used to identify similar elements. As illustrated, the occupant restraint system 100 may include additional tethers. In FIGS. 4 and 5, the occupant restraint system 100 is illustrated to additionally include a second tether 102. Each of the additional tethers may route through the trim component (not shown) and may be disposed in the tether housing 24. The tethers 16 and 102 may be sewn or otherwise secured to the airbag 14 as necessary to maintain a desired positioning of the airbag upon deployment. Alternatively, the external tethers 16 and 102 may consist of a wider fabric panel (not shown) which distributes the tensile loads and provides additional reaction surface for the airbag 14.

Figure 6:
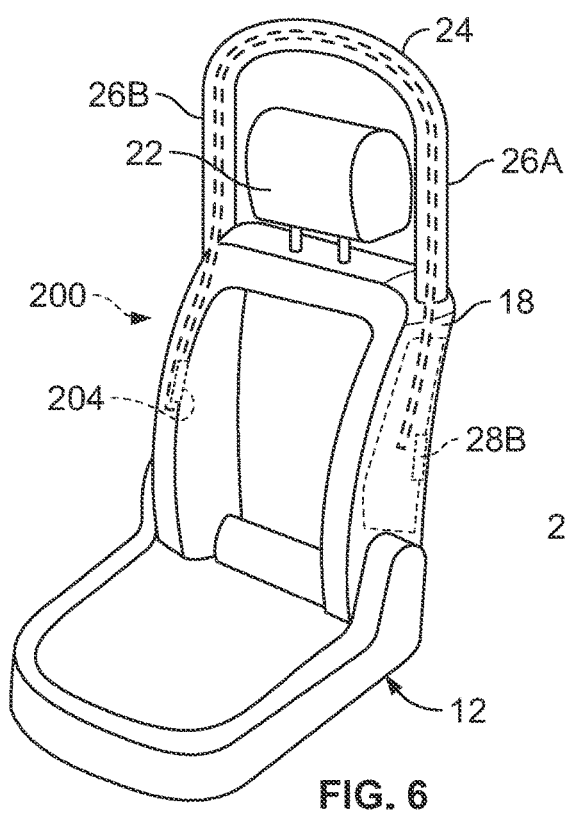
FIG. 6 is another perspective view similar to FIG. 1 illustrating another occupant restraint system in accordance with the present teachings, the occupant restraint system shown prior to deployment.
Figure 7:
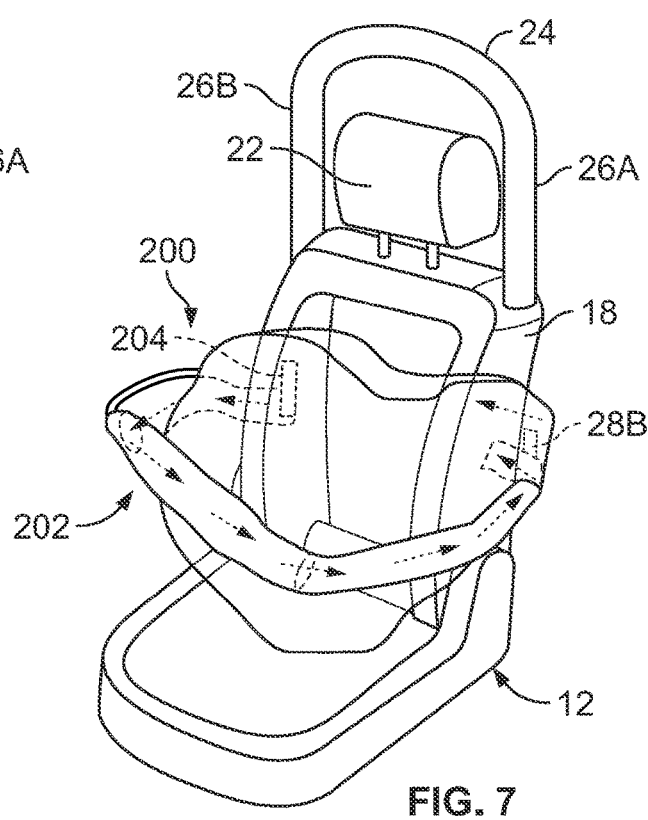
FIG. 7 is a perspective view similar to FIG. 6 illustrating the occupant restraint system of FIG. 6 at full deployment.

Turning to FIGS. 6 and 7, another occupant restraint system in accordance with the present teachings is illustrated and identified at reference character 200. In view of the similarities between the occupant restraint system 200 and the occupant restraint system 10, like reference characters will again be used to identify similar elements. The occupant restraint system 200 differs from the occupant restraint system 10 in that the tether 16 is replaced with an inflatable tether 202. The inflatable tether 202 may be attached to the first and second lateral sides 18A and 18B of the seatback 18 and otherwise similarly stowed within the seat as discussed above concerning occupant restraint systems 10 and 110.

The inflatable tether 202 may be in fluid communication with a second inflator 204. The second inflator 204 may be carried by the seatback 18. As shown, the second inflator 204 is carried at the opposite lateral side of the seatback 18 as compared to the inflator 28. Inflation of the inflatable tether 202 upon sensing of a predetermined accident event may improve tether positioning time as well as provide additional impact protection and energy absorbing during occupant loading in frontal, oblique and side impacts. Alternatively, the inflatable tether 202 may also be directly integrated into the airbag 14 without the need for a separate inflator.

Figure 8:
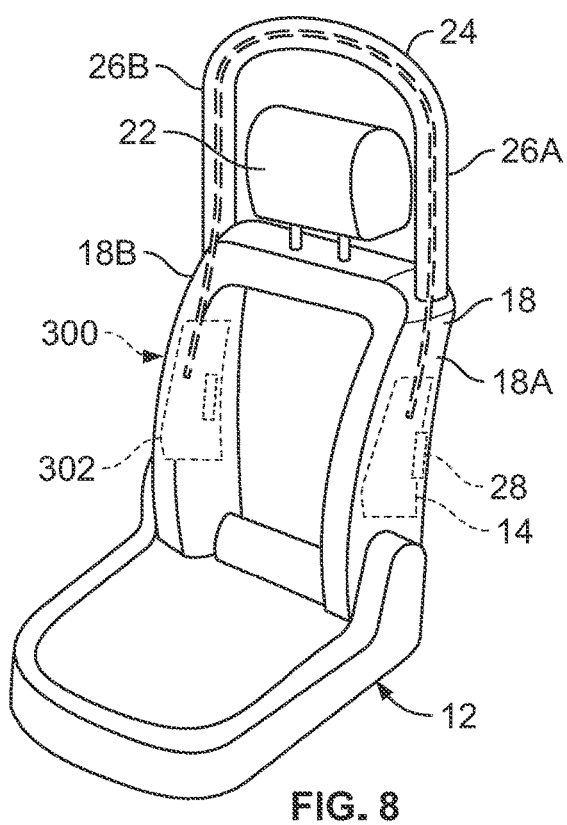
FIG. 8 is another perspective view similar to FIG. 1 illustrating another occupant restraint system in accordance with the present teachings, the occupant restraint system shown prior to deployment.
Figure 9:
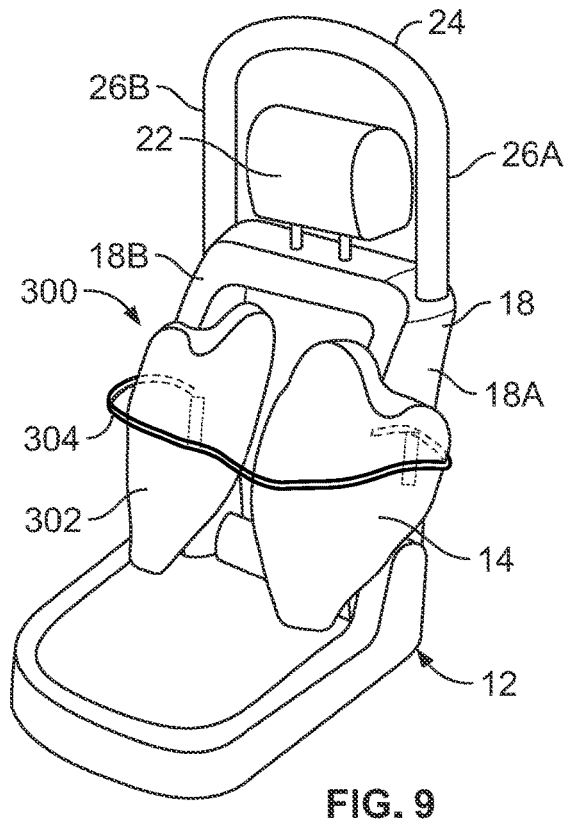
FIG. 9 is a perspective view similar to FIG. 8 illustrating the occupant restraint system of FIG. 8 at full deployment.

Turning to FIGS. 8 and 9, another occupant restraint system in accordance with the present teachings is illustrated and identified at reference character 300. In view of the similarities between the occupant restraint system 300 and the occupant restraint system 10, like reference characters will again be used to identify similar elements. The occupant restraint system 300 differs from the occupant restraint system 10 by incorporating a second airbag 302. The second airbag 302 is carried at and deployable from the second, opposite lateral side of seatback 18.

The occupant restraint system 302 is shown to include a single external tether 304. Additional tethers may be incorporated, however, within the scope of the present teachings. Similar to the embodiments discussed above, the tether 304 may be secured to first and second lateral sides 18A and 18B of the seatback 18. As illustrated, however, the tether 304 may be attached only to the airbags 14 and 302. Still alternatively, two tethers may be employed with one end of a first tether attached to the first lateral side 18A of the seatback 18, a second end of the first tether attached to the second airbag 302, a first end of a second tether attached to the second lateral side 18B, and the second end of the second tether attached to the first airbag 14.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An occupant restraint system for a seat of a vehicle in combination with the seat, the occupant restraint system comprising:
   at least a first airbag stored within a side of a seatback of the seat and deployable from the side of the seatback;
   at least a first tether mounted to the seat and deployable from a stowed position to a deployed position such that the first tether extends around a front facing side of the first airbag from a first lateral side of the seatback of the seat to a second lateral side of the seatbacks; and
   a tether housing carried by the seatback of the seat and upwardly extending from the seatback, the tether housing containing a portion of the tether that extends around the front facing side of the first airbag in the deployed position when the tether is in the stowed position,
   wherein the first tether in the stowed position extends vertically upward from a first end thereof, horizontally from the first lateral side of the seatback to the second lateral side of the seatback and vertically downward to a second end thereof such that the first tether upwardly extends from the seatback between the first and second ends thereof in the stowed position, and wherein the tether housing includes first and second laterally spaced apart legs and the seat includes an adjustable headrest upwardly extending from the seatback and laterally disposed between the first and second laterally spaced apart legs.

2. The occupant restraint system of claim 1, wherein the seat further includes a guide for a seat belt webbing carried by one of a top of the seatback and the tether housing and disposed between the first and second laterally spaced apart legs of the tether housing.

3. The occupant restraint system of claim 1, wherein the first tether is directly attached to the first and second lateral sides of the seatback.

4. The occupant restraint system of claim 1, wherein the first tether is attached directly to the first airbag.

5. The occupant restraint system of claim 1, wherein the occupant restraint system consists of a single airbag.

6. The occupant restraint system of claim 5, wherein the single airbag has an L-shaped geometry in a horizontal plane, the L-shaped geometry including a first leg extending forwardly in a direction of vehicle travel and a second leg extending laterally from the first lateral side of the seat.

7. The occupant restraint system of claim 1, further comprising a second tether attached to the seat and extending through the tether housing.

8. The occupant restraint system of claim 1, wherein the first tether is an inflatable tether.

9. The occupant restraint system of claim 8, wherein the inflatable tether and the first airbag are inflated by a common source of inflation gas.

10. The occupant restraint system of claim 1, further comprising a second airbag carried by the seat and deployable from the second lateral side of the seatback, the first airbag deployable from the first lateral side of the seatback.

11. The occupant restraint system of claim 10, wherein the first tether is attached directly to the first airbag and directly to the second airbag and only indirectly attached to the seat through direct attachment to the first and second airbags.

12. A method of protecting a vehicle occupant with the occupant restraint system of claim 1, the method comprising deploying the first tether from the stowed position to the deployed position to surround a front facing side of the first airbag upon deployment of the first airbag.

13. The occupant restraint system of claim 1, wherein the first airbag is stowed in the first lateral side of the seatback of the seat.

14. An occupant restraint system for a seat of a vehicle in combination with the seat, the occupant restraint system comprising:

at least a first airbag carried by the seat and deployable from the seat; and at least a first tether mounted to the seat and deployable from a stowed position to a deployed position such that the first tether extends around a front facing side of the first airbag from a first lateral side of a seatback of the seat to a second lateral side of the seatback, wherein the first tether has a first end attached to the first lateral side of the seatback and a second end attached only to the first airbag.

15. An occupant restraint system for a seat of a vehicle in combination with the seat, the occupant restraint system comprising:

a seatback;

a first airbag carried at a first lateral side of the seatback and deployable from a side of the seatback; and a first tether mounted to the seatback, the first tether including a central portion normally stowed within a tether housing having first and second laterally spaced apart legs upwardly extending from the seatback, wherein the first tether is deployable from a stowed position to a deployed position such that the first tether extends around a front facing side of the first airbag from first lateral side of the seatback of the seat to a second lateral side of the seatback, and wherein the first tether in the stowed position extends vertically upward from a first end thereof, horizontally from the first lateral side of the seatback to the second lateral side of the seatback and vertically downward to a second end thereof such that the first tether upwardly extends from the seatback between the first and second ends thereof in the stowed position.

16. The occupant restraint system of claim 15, further comprising a headrest upwardly extending from the seatback, the headrest positioned between the first and second laterally spaced legs of the tether housing.

17. The occupant restraint system of claim 15, further comprising a guide for a seat belt webbing disposed between the first and second laterally spaced legs of the tether housing.

18. The occupant restraint system of claim 17, wherein the guide for the seat belt webbing is carried by one of a top of the seatback and the tether housing.

19. The occupant restraint system of claim 15, wherein the first airbag is stowed in the first lateral side of the seatback of the seat and the first tether upwardly extends from the first airbag and further wherein the first tether wraps around the first airbag upon deployment of the first airbag.

* * * * *